(12) United States Patent
Yuki et al.

(10) Patent No.: US 8,705,168 B2
(45) Date of Patent: Apr. 22, 2014

(54) SIGNAL LIGHT MONITORING APPARATUS, OPTICAL AMPLIFICATION APPARATUS AND OPTICAL RECEPTION APPARATUS, AND SIGNAL LIGHT MONITORING METHOD

(75) Inventors: Masahiro Yuki, Kawasaki (JP); Kentaro Nakamura, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 13/476,351

(22) Filed: May 21, 2012

(65) Prior Publication Data

US 2012/0230682 A1    Sep. 13, 2012

Related U.S. Application Data

(62) Division of application No. 12/107,202, filed on Apr. 22, 2008, now Pat. No. 8,203,781.

(30) Foreign Application Priority Data

Apr. 27, 2007   (JP) .................................. 2007-117842

(51) Int. Cl.
*H04B 10/17* (2011.01)
*G02B 5/30* (2006.01)
*H04B 10/12* (2011.01)

(52) U.S. Cl.
USPC .......................... 359/341.4; 359/337; 359/352

(58) Field of Classification Search
USPC ............. 359/337, 341.4, 352, 489.07, 489.15
See application file for complete search history.

(56) References Cited

U.S. PATENT DOCUMENTS

| | | | |
|---|---|---|---|
| 3,700,334 | A | 10/1972 | Low et al. |
| 5,659,560 | A | 8/1997 | Ouchi et al. |
| 6,211,957 | B1 | 4/2001 | Erdogan et al. |
| 6,671,045 | B1 | 12/2003 | Lee et al. |
| 6,885,821 | B2 | 4/2005 | Cooney et al. |
| 6,940,594 | B2 | 9/2005 | Tucker et al. |
| 7,088,878 | B2 | 8/2006 | Waagaard et al. |
| 7,142,737 | B1 | 11/2006 | Murphy et al. |
| 2004/0067057 | A1 | 4/2004 | Akiyama et al. |
| 2004/0246568 | A1 | 12/2004 | Onaka et al. |
| 2006/0126066 | A1 | 6/2006 | Kawakami et al. |

FOREIGN PATENT DOCUMENTS

| | | |
|---|---|---|
| JP | 7-321416 | 12/1995 |
| JP | 2001-168813 | 6/2001 |
| JP | 2004-112427 | 4/2004 |

OTHER PUBLICATIONS

Japanese Patent Office Notificaiton of Reasons for Refusal mailed Sep. 6, 2011 for corresponding Japanese Patent Application No. 2007-117842.

Taihei Miyakoshi et al., "A Stufy for Wavelength Dependency of Polarization Analysis Module", Institute of Electronics, Information and Communication Engineers General Meeting Papers 2001, Communications (2), Japan, Institute of Electronics, Information and Communication Engineers, p. 528, Mar. 7, 2011.

(Continued)

*Primary Examiner* — Eric Bolda
(74) *Attorney, Agent, or Firm* — Staas & Halsey LLP

(57) ABSTRACT

According to an aspect of an embodiment, an apparatus includes an optical branching unit for branching an input signal light in four directions, a polarization component extraction unit extracting four polarization components having mutually different polarization parameters from lights branched in four directions by the optical branching unit, and a determination unit determining input/non-input of the signal light based on the four polarization components extracted by the polarization component extraction unit.

14 Claims, 11 Drawing Sheets

(56) References Cited

OTHER PUBLICATIONS

Restriction Requirement mailed Apr. 23, 2010 in co-pending U.S. Appl. No. 12/107,202.
Office Action mailed Oct. 19, 2010 in co-pending U.S. Appl. No. 12/107,202.
Final Office Action mailed Apr. 1, 2011 in co-pending U.S. Appl. No. 12/107,202.
Notice of Allowance mailed Feb. 22, 2012, in co-pending U.S. Appl. No. 12/107,202.
U.S. Appl. No. 12/107,202, filed Apr. 22, 2008, Masahiro Yuki et al., Fujitsu Limited.

FIG. 2A LINEAR POLARIZATION

FIG. 2B CIRCULAR POLARIZATION

FIG. 2C ELLIPTICAL POLARIZATION

FIG. 2D ASE

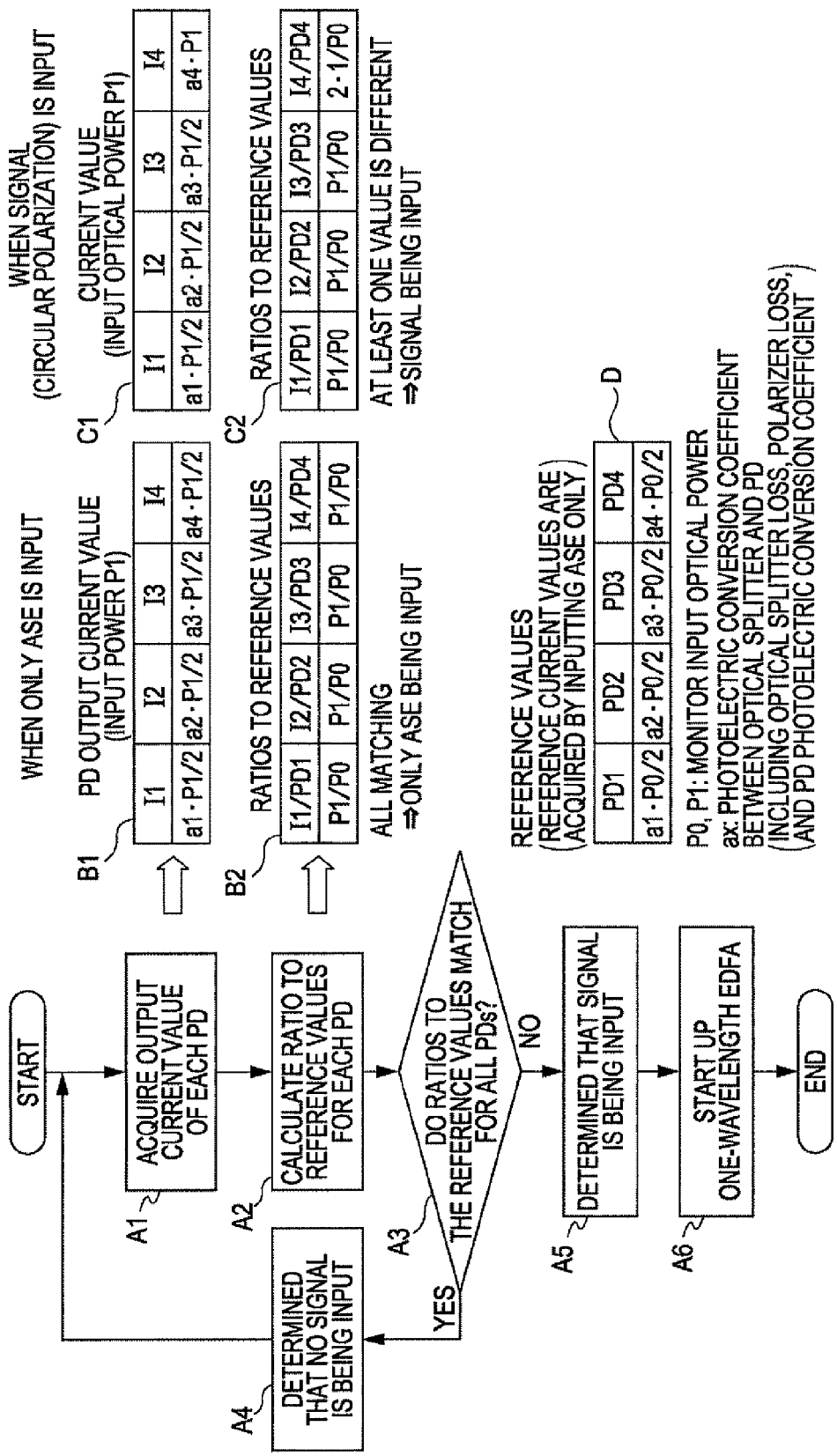

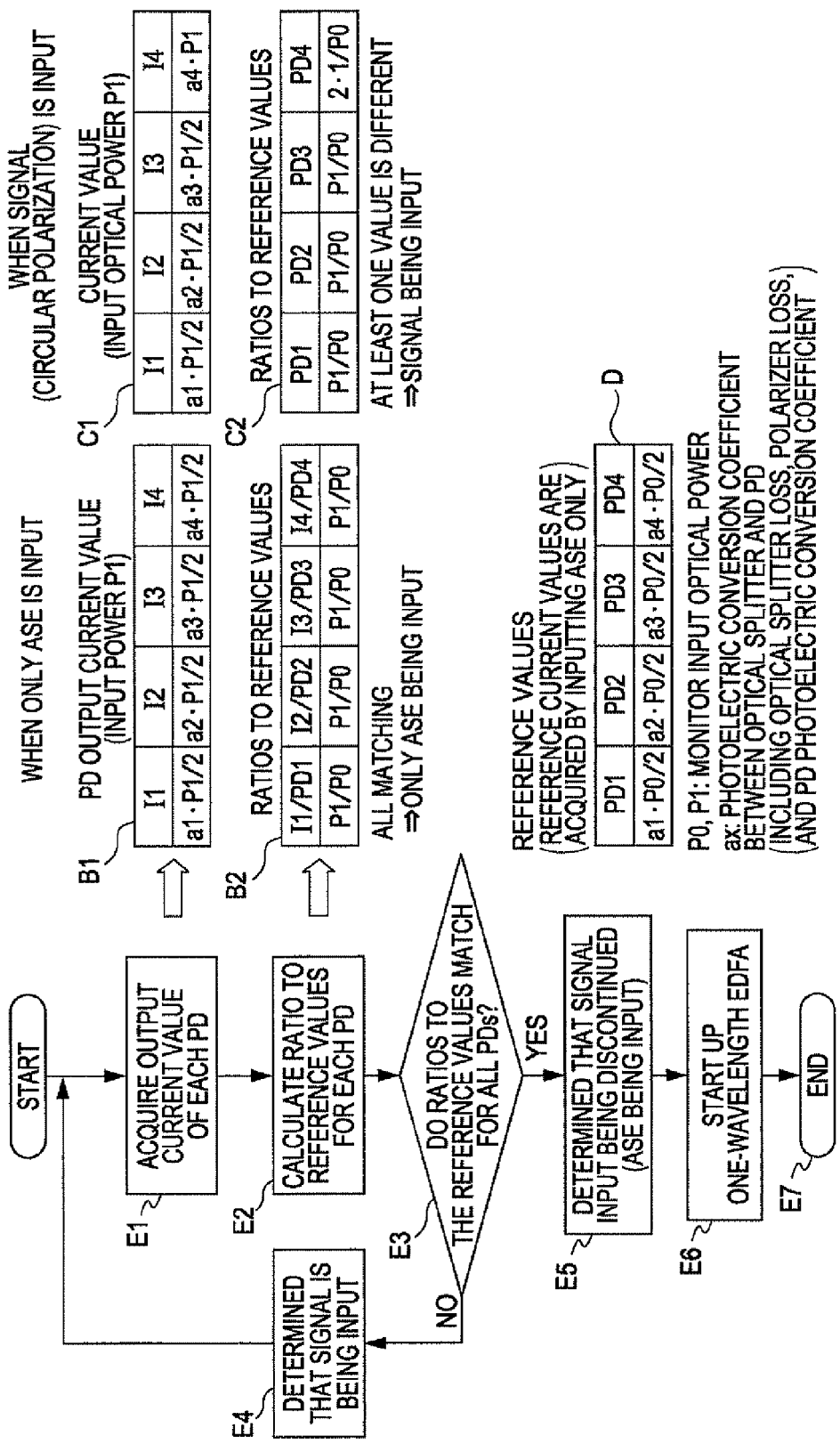

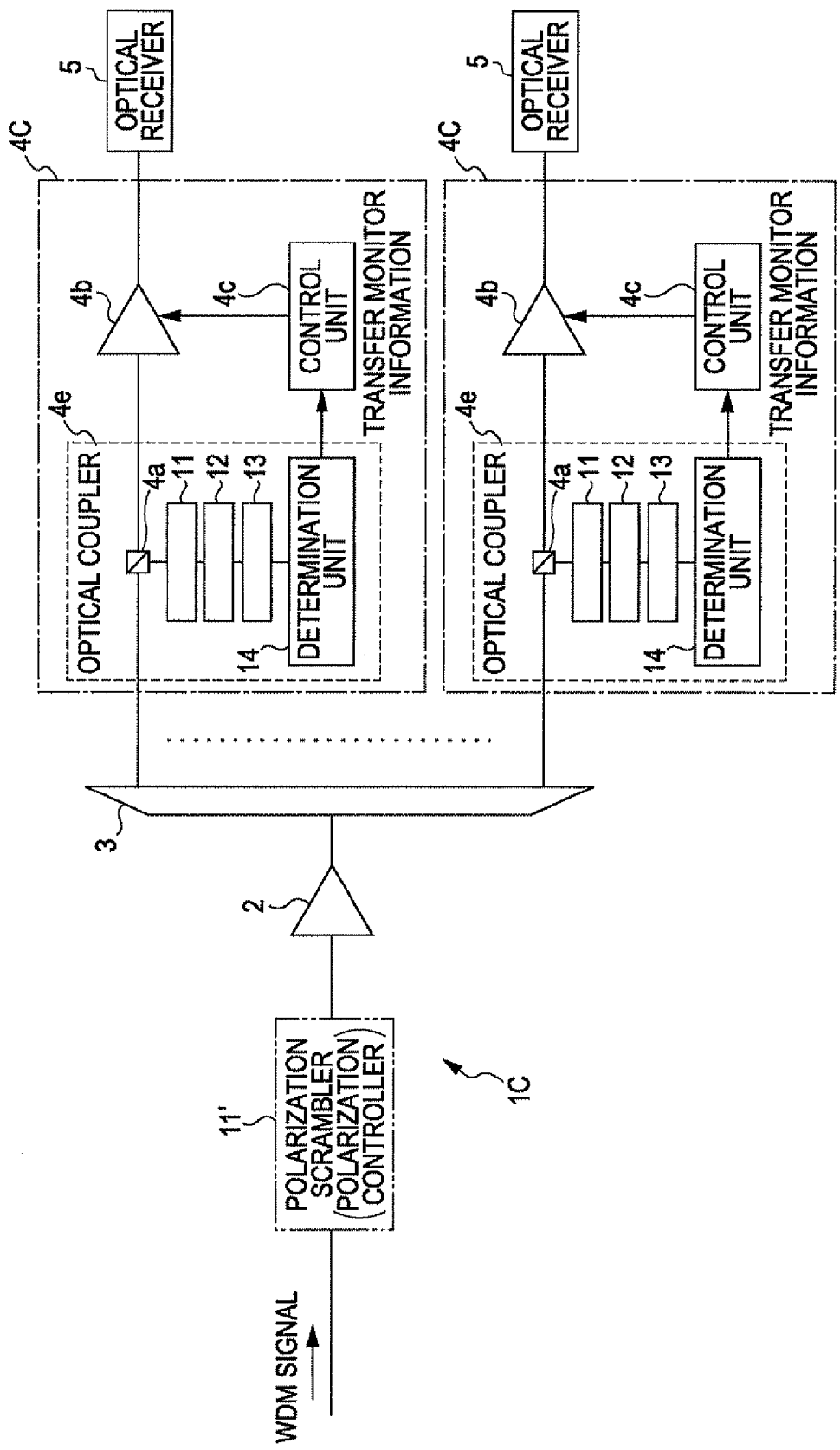

LIGHT SIGNAL IS BEING INPUT

LIGHT SIGNAL IS BEING DISCONTINUED (ASE ONLY)

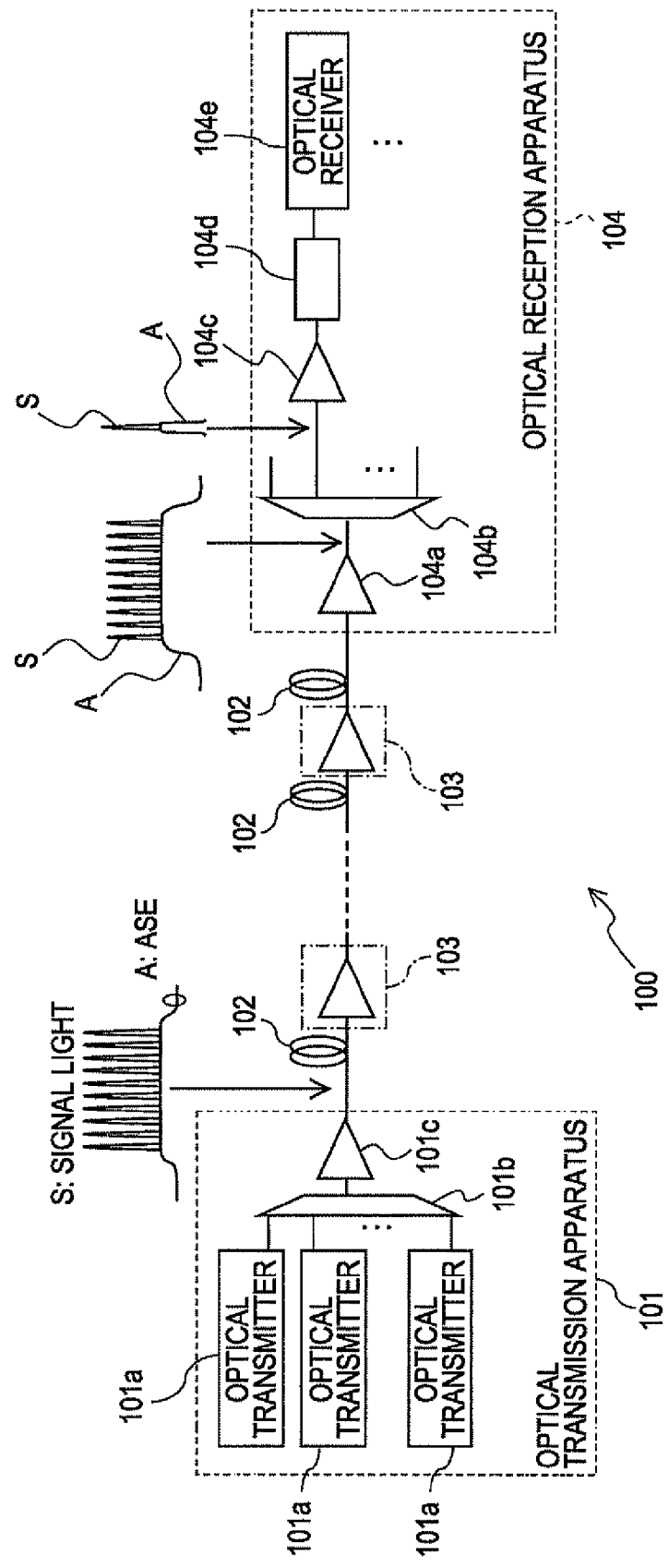

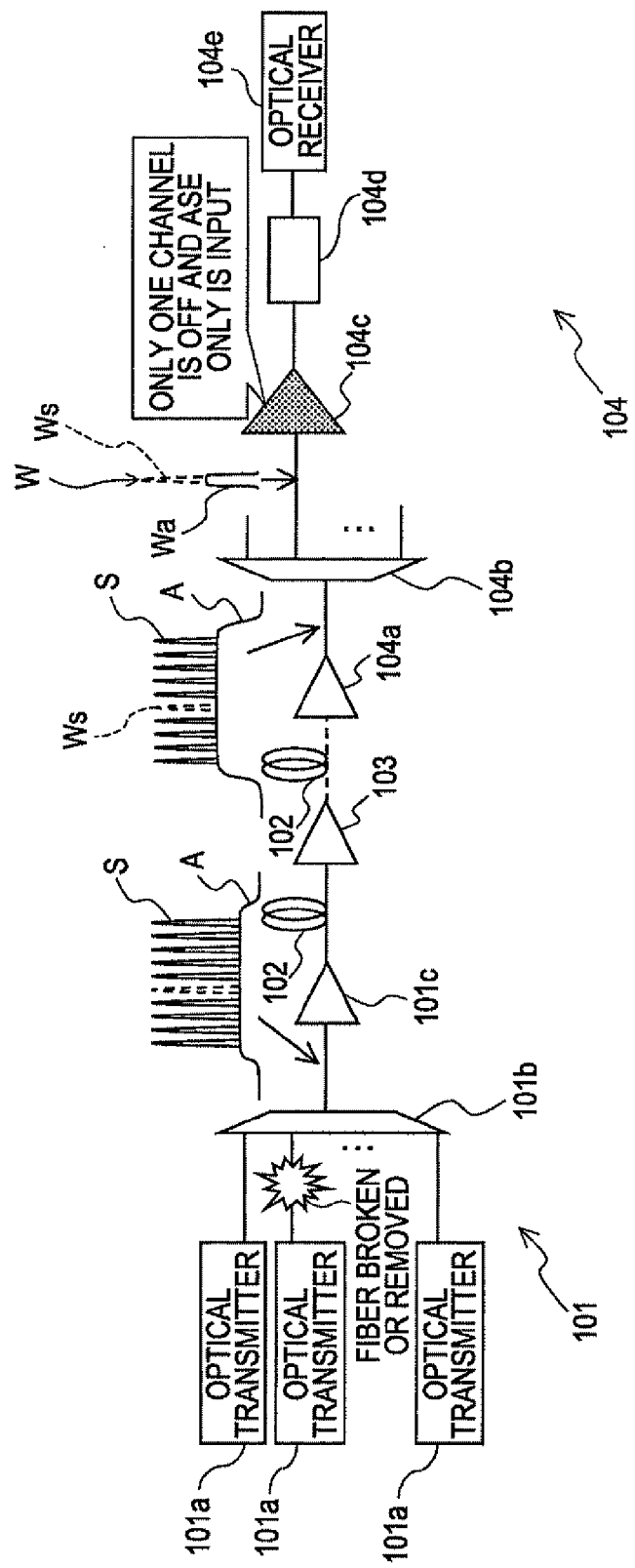

SIGNAL LIGHT MONITORING APPARATUS, OPTICAL AMPLIFICATION APPARATUS AND OPTICAL RECEPTION APPARATUS, AND SIGNAL LIGHT MONITORING METHOD

CROSS-REFERENCE TO RELATED APPLICATIONS

This application is a divisional of U.S. application Ser. No. 12/107,202, filed Apr. 22, 2008 now U.S. Pat. No. 8,203,781, which claims the benefit of priority to Japanese Patent Application No. 2007-117842, filed on Apr. 27, 2007, in the Japanese Intellectual Property Office, the disclosures of which are incorporated herein by reference.

TECHNICAL FIELD

The present invention relates to a signal light monitoring apparatus, an optical amplification apparatus and an optical reception apparatus, and a signal light monitoring method. Further, the present invention in particular relates to a technology suitable for use in an optical reception apparatus of an optical communication system using a wavelength division multiplexing technology.

DESCRIPTION OF THE RELATED ART

FIG. 9 is a diagram for illustrating a configuration example of a general optical communication system. An optical communication system 100 shown in FIG. 9 includes an optical transmission apparatus 101, a transmission line fiber 102, an optical amplifier (optical amplifier repeater) 103, and an optical reception apparatus 104 so that a light signal from the optical transmission apparatus 101 is transmitted through the transmission line fiber 102 and amplified by the optical amplifier 103 before being received by the optical reception apparatus 104.

Here, the optical transmission apparatus 101 includes a plurality of optical transmitters 101a capable of transmitting signal lights having mutually different wavelengths, an optical multiplexer 101b for multiplexing signal lights from the optical transmitters 101a, and an optical amplifier 101c capable of amplifying lights from the optical multiplexer 101b to send out a wavelength division multiplexing (WDM) signal light to the side of the transmission line fiber 102. The optical reception apparatus 104 includes a WDM optical amplifier 104a and an optical demultiplexer 104b, and also includes, corresponding to light demultiplexed by the optical demultiplexer 104b, an optical amplifier 104c for amplification of one wavelength, a variable wavelength dispersion compensator 104d, and an optical receiver 104e. The optical amplifier 104c for amplification of one wavelength may be an optical amplifier for WDM.

The optical amplifier 103 optically amplifies a light signal whose power has decreased after being transmitted through the transmission line fiber 102. A WDM optical amplifier capable of collectively amplifying WDM light signals transmitted through the transmission line fiber 102 can be used as the optical amplifier 103. The optical amplifier currently most widely used as the optical amplifiers 101c, 103, and 104c includes an erbium-doped fiber amplifier (EDFA).

In such an EDFA, as shown in FIG. 9, a signal light S is amplified and, simultaneously, an amplified spontaneous emission (ASE) is generated. The ASE has random amplitude, phase, and polarization, and leads to deterioration of a light signal to noise ratio. The ASE generated in the EDFA acting as the optical amplifiers 101c and 103 is accumulated each time after passing through the optical amplifier 103 in a relay stage before finally being input into the optical reception apparatus 104 together with light signals.

Further, in a high-speed optical transmission system whose transmission speed per wavelength is, for example, 40 Gbit/s, a tolerance for wavelength dispersion is extremely small and therefore, it becomes necessary to make high-precision wavelength dispersion compensation by the wavelength dispersion compensator 104d in the optical reception apparatus 104 described above. A virtually imaged phased array (VIPA) variable dispersion compensator is known as the variable wavelength dispersion compensator 104d whose wavelength dispersion value can be varied. Compared with application of a dispersion compensation fiber having a fixed wavelength dispersion value, application of the variable wavelength dispersion compensator 104d allows a reduction of a dispersion compensator menu and also optimization of the amount of dispersion at all times while setting tracking of variations with time of the wavelength dispersion value during system operation.

However, since optical losses increase when the wavelength dispersion compensator 104d described above is applied, optical power may be insufficient for an input dynamic range of the optical receiver 104e in a subsequent stage. The optical amplifier 104c for amplification of one wavelength compensates for optical losses in the variable wavelength dispersion compensator 104d described above by amplifying light of each wavelength demultiplexed by the optical demultiplexer 104b to make up for insufficient input light power into the optical receiver 104e.

Since waveform deterioration caused by polarization mode dispersion (PMD) also becomes pronounced in a system in which the transmission speed per wavelength exceeds 40 Gbit/s, a PMD compensator (not shown) may be placed between the optical demultiplexer 104b and the optical receiver 104e. Also in such a case, optical losses are caused by the PMD compensator and thus, it becomes necessary to compensate for optical losses caused by the PMD compensator by performing optical amplification using each of the above optical amplifiers 104c for amplification of one wavelength.

Even if the above wavelength dispersion compensator 104d or PMD compensator is not applied, an optical amplifier is applied to compensate for optical losses caused by optical elements constituting an optical reception apparatus.

In the optical communication system 100 in which such wavelength division multiplex transmission is applied, the WDM signal light S transmitted from the optical transmission apparatus 101 is received by the optical receiver 104e in the optical reception apparatus 104 in units of channels after undergoing amplification by the optical amplifier 103 in the relay stage. At this time, it is assumed that channel components constituted by wavelength division multiplexed signal light received by the optical reception apparatus 104 may fluctuate during operation. If, for example, as shown in FIG. 10, a transmission-side fiber in the optical transmission apparatus 101 breaks during operation of 40 channels of wavelength division multiplexed signal light, only one certain channel is turned off.

If, in this case, signal light input is turned off when the optical amplifier 104c of the optical reception apparatus 104 is up and running, that is, excited as an EDFA, excitation energy in an EDF constituting the EDFA accumulates. If, then, the signal light input is turned on again after being turned off, a light surge in which output power of the optical amplifier 104c dramatically increases due to accumulated excitation energy is caused. Light exceeding power permissible for reception by the optical receiver 104e may be input by such a surge.

Thus, in a related technology, for example, input power into the optical amplifier 104c is monitored and the value of the input power and a threshold preset near a lower limit of the signal input range are compared. If the value of the input power is smaller than the threshold, discontinuation of signal input is determined and a control operation to shut down excitation of the optical amplifier 104c is performed.

In addition, the techniques related to the present invention are disclosed in Japanese Patent Application Laid-Open Nos. 2004-112427 and 7-321416.

SUMMARY

According to an aspect of an embodiment, an apparatus includes: an optical branching unit for branching an input signal light in four directions; a polarization component extraction unit extracting four polarization components having mutually different polarization parameters from lights branched in four directions by the optical branching unit; and a determination unit determining input/non-input of the signal light based on the four polarization components extracted by the polarization component extraction unit.

The above is only an example of an aspect of an embodiment. All embodiments are not limited to including all the features in this example.

BRIEF DESCRIPTION OF THE DRAWINGS

FIG. 3 is a diagram for illustrating operations of the first embodiment;

FIG. 4 is a diagram for illustrating operations of the first embodiment;

FIG. 7 is a diagram for illustrating an optical reception apparatus in a third embodiment;

FIG. 9 is a diagram for illustrating a configuration example of a general optical communication system;

FIG. 10 is a diagram for illustrating a background technology of the present embodiment.

DETAILED DESCRIPTION OF THE PREFERRED EMBODIMENTS

Embodiments will be described below with reference to drawings.

However, the present invention is not limited to the embodiments below.

[A] Description of the First Embodiment

Figure 1:
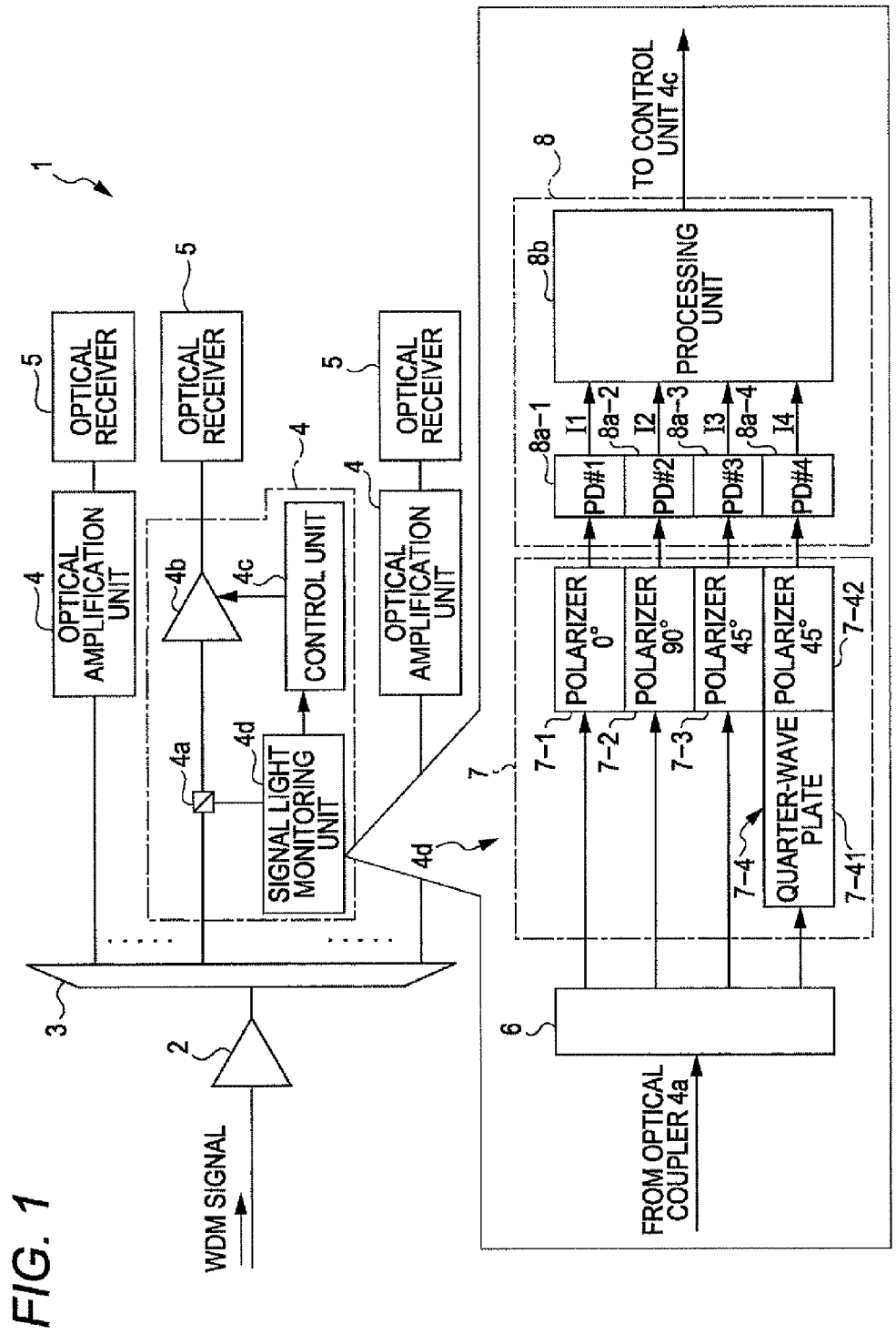
FIG. 1 is a diagram for illustrating an optical reception apparatus in a first embodiment.

FIG. 1 is a diagram for illustrating an optical reception apparatus 1 in the first embodiment. The optical reception apparatus 1 is applied to an optical communication system basically similar to the above optical communication system (reference numerals 104a, 104b, and 104e) shown in FIG. 9 and includes a WDM optical amplifier 2, an optical demultiplexer 3, and an optical receiver 5. However, the configuration of optical amplification units (apparatus) 4 in which each light having a channel-matching wavelength demultiplexed by the optical demultiplexer 3 is optically amplified is different from that of the optical amplifier 104c shown in FIG. 9.

The optical amplification units 4 are each provided on an optical directional path for each wavelength on which light demultiplexed by the optical demultiplexer 3 propagates to amplify the light having a channel-matching wavelength demultiplexed by the optical demultiplexer 3. Each of the optical amplification units 4 includes an optical coupler (optical CPL) 4a and also an optical amplifier 4b, a control unit 4c, and a signal light monitoring unit 4d.

If focused on one of the optical amplification units 4, the optical coupler 4a branches light in units of channels demultiplexed by the optical demultiplexer 3 in two directions to output one light to the optical amplifier 4b and the other light to an optical splitter 6.

The optical amplifier 4b has one light branched by the optical coupler 4a input and amplifies the input light by excitation power. That is, the optical amplifier 4b includes not only an amplification medium such as an EDF (not shown), but also an excitation light feeding unit for feeding excitation light to the amplification medium. The control unit 4c controls feeding of excitation power to the optical amplifier 4b. More specifically, the control unit 4c controls feeding of excitation power by outputting a control signal to the excitation light feeding unit constituting the above optical amplifier 4b.

The signal light monitoring unit 4d has the other light branched by the optical coupler 4a input and monitors an input state of a signal light being input into the optical amplifier 4b based on light from the optical coupler 4a. Particularly in the signal light monitoring unit 4d, it is possible to determine input/non-input of a signal light based on a polarization state of light from the optical coupler 4a.

Depending on a determination result of input/non-input of a signal light by the signal light monitoring unit 4d, the control unit 4c can control the optical amplifier 4b to turn on feeding of excitation power to the optical amplifier 4b if the signal light is being input, while turning off feeding of excitation power to the optical amplifier 4b if no signal light is being input.

The signal light monitoring unit 4d includes the optical splitter 6, a polarization component extraction unit 7, and a determination unit 8 to determine input/non-input of the above signal light. The optical splitter 6 is an optical branching unit that further branches light being input into the optical amplifier 4b, that is, light from the optical coupler 4a in four directions. The polarization component extraction unit 7 extracts four polarization components having mutually different polarization parameters from lights branched in four directions by the optical splitter 6.

If lights branched by the optical splitter 6 in four directions are denoted as first to fourth branched lights, the polarization component extraction unit 7 in the first embodiment includes first to fourth extraction units 7-1 to 7-4 for extracting polarization components having mutually different polarization parameters from the first to fourth branched lights respectively. Here, the first extraction unit 7-1 extracts a polarization component of the first branched light whose azimuth is a reference angle and can be formed of a first polarizer for which the reference angle is set as the azimuth with respect to the first branched light.

The second extraction unit 7-2 extracts a polarization component of the second branched light whose azimuth is an angle perpendicular to the above reference angle and can be formed of a second polarizer for which the angle perpendicular to the above reference angle is set as the azimuth with respect to the second branched light. If, for example, an azimuth of 0 degree with respect to a specific orientation is set as the reference angle for the first polarizer constituting the first extraction unit 7-1, an angle of 90 degrees (or −90 degrees) with respect to the reference angle 0 degree can be set as the azimuth for the second extraction unit 7-2.

Further, the third extraction unit 7-3 extracts a polarization component of the third branched light whose azimuth is an intermediate angle of the azimuths of polarization components extracted by the first extraction unit 7-1 and the second extraction unit 7-2, and can be formed, for example, of a third polarizer for which the above intermediate angle is set as the azimuth with respect to the third branched light. If, for example, the azimuths of 0 degree and 90 degrees (or −90 degrees) with respect to the specific orientation are set as the reference angles for the first polarizer and the second polarizer constituting the first extraction unit 7-1 and the second extraction unit 7-2 respectively, the angle of 45 degrees (or −45 degrees) with respect to the reference angle 0 degree can be set as the azimuth for the third extraction unit 7-3.

The fourth extraction unit 7-4 extracts a polarization component of the fourth branched light the polarization state of which being rotated by 90 degrees whose azimuth is the same angle as that of the third extraction unit 7-3. The fourth extraction unit 7-4 can be formed, for example, of a quarter-wave plate 7-41 for which the above reference angle is set as the azimuth with respect to the fourth branched light and a fourth polarizer 7-42 for outputting a polarization component with the intermediate angle in the third extraction unit 7-3 set as the azimuth with respect to light from the quarter-wave plate 7-41. If the angle of 45 degrees with respect to the reference angle 0 degree is set as the azimuth for the third polarizer constituting the third extraction unit 7-3, the reference angle is set as the azimuth for the quarter-wave plate 7-41 and the intermediate angle 45 degrees is set as the azimuth for the fourth polarizer 7-42.

The determination unit 8 determines input/non-input of a signal light based on four polarization components extracted by the polarization component extraction unit 7 and outputs a result of this determination to the control unit 4c. The determination unit 8 in the first embodiment includes first to fourth photo-diodes 8a-1 to 8a-4 and a processing unit 8b. The first to fourth photo-diodes 8a-1 to 8a-4 output electric signals (here current signals) of magnitudes in accordance with received power of polarization components extracted by the first to fourth extraction units 7-1 to 7-4 constituting the above polarization component extraction unit 7 respectively and are power detectors for detecting power of four polarization components extracted by the polarization component extraction unit 7 respectively.

The processing unit 8b determines whether light having wavelengths in units of channels input into the optical amplification units 4 contains any signal light component based on differences of power of four polarization components detected by the first to fourth photo-diodes 8a-1 to 8a-4 and has a function as a determination result output unit. More specifically, if power of all polarization components detected by the first to fourth photo-diodes 8a-1 to 8a-4 is the same, the processing unit 8b outputs a message to the effect that no signal light is being input. If the magnitude of power of at least one polarization component of the four polarization components is different from that of other polarization components, the processing unit 8b outputs a message to the effect that the signal light is being input.

FIG. 2 is a diagram for illustrating how to determine an input state of a signal light based on differences of power of the four polarization components. A WDM signal light input into the optical reception apparatus 1 is amplified by the WDM optical amplifier 2 and ASE light is accumulated by this amplification operation together with the optical amplifiers (See reference numerals 101c and 103 in FIG. 9) interposed by the transmission line fiber (See reference numeral 102 in FIG. 9). In the signal light monitoring unit 4d, whether an input light contains any signal light component or contains no signal light component and only ASE components only is determined based on differences of power of the above four polarization components.

FIG. 2A to FIG. 2D are diagrams for illustrating output currents I1 to I4 from the first to fourth photo-diodes 8a-1 to 8a-4 when lights of linear polarization, circular polarization, elliptical polarization, and no polarization are input respectively. The horizontal axis in FIG. 2A to FIG. 2D is the azimuth ($\phi$=0 to 180 degrees) of the major axis of an ellipse, which is a parameter for specifying the polarization state. Here, it is assumed that optical losses from the optical splitter 6 to the first to fourth photo-diodes 8a-1 to 8a-4 and photo-electric conversion efficiencies of the first to fourth photo-diodes 8a-1 to 8a-4 are equal and the maximum value of output current values of the first to fourth photo-diodes 8a-1 to 8a-4 is normalized to "1".

Here, only ASE light of the relevant wavelength is input into the signal light monitoring unit 4d when no signal light is input and therefore, as shown in FIG. 2D, the current output values I1, I2, I3, and I4 of the first to fourth photo-diodes 8a-1 to 8a-4 all match regardless of the value of $\phi$. On the other hand, when any signal light is contained in light being input into the signal light monitoring unit 4d, the light is at least not in a non-polarization state and therefore, characteristics of one of the output current values of FIG. 2A to FIG. 2C will be displayed. That is, at least one of the current output values I1, I2, I3, and I4 of the first to fourth photo-diodes 8a-1 to 8a-4 is different regardless of the value of $\phi$.

Figure 2E:
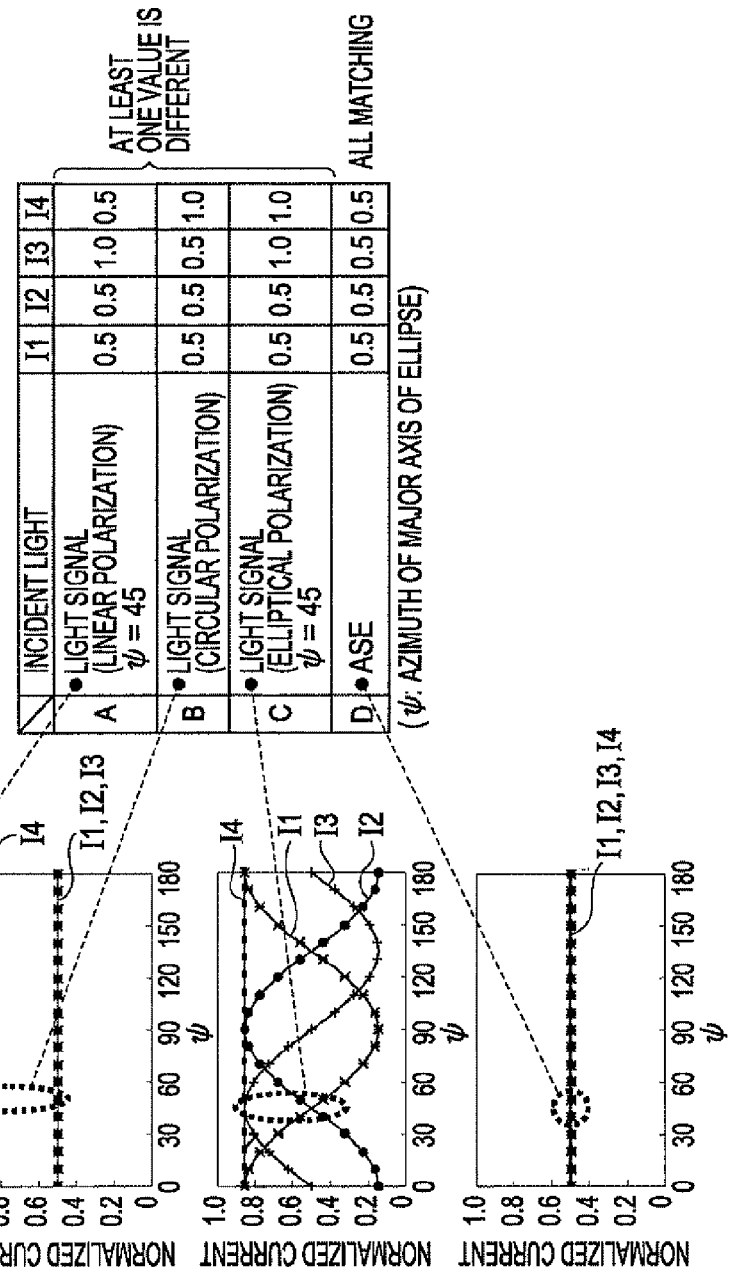
FIG. 2 is a diagram for illustrating how to determine an input state of a signal light based on differences of power of four polarization components.

As a concrete example, patterns of I1 to I4 when lights of linear polarization, circular polarization, elliptical polarization, and no polarization in FIG. 2A to FIG. 2D are input and particularly the azimuth $\phi$ of the major axis of an ellipse is set to 45 degrees are shown in A to D of FIG. 2E respectively. If, in this case, the input light input into the signal light monitoring unit 4d is a linearly polarized light, as shown in A of FIG. 2E, I1, I2, and I4 have a matching value of "0.5", but I3 is "1" and thus, the current value of the third photo-diode 8a-3 is different from the current values of the other photo-diodes 8a-1, 8a-2, and 8a-4.

Similarly, if the input light input into the signal light monitoring unit 4d is a circularly polarized light, as shown in B of FIG. 2E, I1 to I3 have a matching value of "0.5", but I4 is "1" and thus, the current value of the fourth photo-diode 8a-4 is different from the current values of the other photo-diodes 8a-1 to 8a-3. Further, if the input light input into the signal light monitoring unit 4d is an elliptically polarized light, as shown in C of FIG. 2E, I1 and I2 are "0.5" while I3 and I4 are "1".

Thus, the signal light monitoring unit 4d may be said to have properties that at least one of the current values in accordance with optical power obtained by the first to fourth photo-diodes 8a-1 to 8a-4 is different regardless of the polarization state (linear polarization, circular polarization, elliptical polarization, and the value of φ) while a signal light is being input, but all current values obtained by the first to fourth photo-diodes 8a-1 to 8a-4 are equal while no signal light is being input.

Therefore, as described above, after being input the current values from the first to fourth photo-diodes 8a-1 to 8a-4, the processing unit 8b can output a determination result to the control unit 4c that a signal light is being input if at least one of these current values is different, and a determination result that no signal light is being input if all current values are substantially equal.

Accordingly, the control unit 4c can control start-up and shutdown of the optical amplifier 4b by using a determination result from the processing unit 8b.

When the optical reception apparatus 1 constructed as described above has a WDM light signal input through the transmission line fiber, the WDM light signal is demultiplexed by the optical demultiplexer 3 into lights for each channel. The optical amplification units 4 are each provided on an optical directional path for each wavelength to be demultiplexed by the optical demultiplexer 3 and the light of the wavelength for each channel from the optical demultiplexer 3 is amplified by the optical amplifier 4b before being output to the optical receiver 5.

At this time, the signal light monitoring unit 4d constituting each of the optical amplification units 4 determines input/non-input of a signal light concerning an input light from the optical demultiplexer 3 with a simple monitor configuration of optical power and the control unit 4c can control on/off of the excitation state in the optical amplifier 4b in accordance with the determination result from the signal light monitoring unit 4d and therefore, accumulation of excitation energy when no signal light is being input can be suppressed so that an occurrence of light surges when a signal light is being input can be prevented.

FIG. 3 is an operation explanatory diagram focusing on operations when excitation control for the optical amplifier 4b is switched from off to on after light being input into the optical amplification unit 4 undergoes a transition of state containing no signal light to that containing a signal light.

That is, while the control unit 4c constituting the optical amplification unit 4 controls the optical amplifier 4b to turn off the excitation state for non-operational channels, when signal light input is determined by the signal light monitoring unit 4d, the control unit 4c controls the optical amplifier 4b to turn on the excitation state.

Here, the signal light monitoring unit 4d has a portion of light input into the optical amplification unit 4 input through the optical coupler 4a. Then, the input branched light is branched in four directions by the optical splitter 6 and four mutually different polarization components are extracted by the polarization component extraction unit 7 from four branched lights from the optical splitter 6. That is, the polarization component extraction unit 7 outputs a light passing through a polarizer constituting the first extraction unit 7-1 and whose azimuth is 0 degree, a light passing through a polarizer constituting the second extraction unit 7-2 and whose azimuth is 90 degrees, a light passing through a polarizer constituting the third extraction unit 7-3 and whose azimuth is 45 degrees, and a light passing through the quarter-wave plate 7-41 constituting the fourth extraction unit 7-4 and whose azimuth is 0 degree and the fourth polarizer 7-42 constituting the fourth extraction unit 7-4 and whose azimuth is 45 degrees as first to fourth polarization component extracted lights.

The first to fourth photo-diodes 8a-1 to 8a-4 constituting a power detector detect power of the first to fourth polarization component extracted lights extracted by the polarization component extraction unit 7 respectively and output electric signals (here, the current signals I1 to I4) as detection results to the processing unit 8b (step A1). Then, based on an input electric signal, the processing unit 8b determines whether power of the above first to fourth polarization component extracted lights is all equal or power of at least one polarization component extracted light is different before outputting a determination result to the control unit 4c.

More specifically, the processing unit 8b calculates ratios I1/PD1 to I4/PD4 of the current values I1 to I4 from the photo-diodes 8a-1 to 8a-4 to reference values PD1 to PD4 preset for the current values I1 to I4 respectively to determine whether power of polarization component lights is equal by comparing the ratios calculated in this manner with each other (step A2).

Here, the reference value PDi (i=1 to 4) is an adjustment value provided for determining whether power of polarization component lights is equal based on the output current Ii from the photo-diode 8a-i and if the value corresponding to normalized optical power is P0, as shown in D of FIG. 3, PDi is given as ai·P0/2, where ai (i=1 to 4) is a coefficient to be set in accordance with an optical loss from the optical splitter 6 to the first to fourth photo-diodes 8a-1 to 8a-4 and fluctuations in photoelectric conversion efficiency of the first to fourth photo-diodes 8a-1 to 8a-4.

Here, it is assumed, for example, that the current values I1 to I4 from the first to fourth photo-diodes 8a-1 to 8a-4 are, as shown in B1 of FIG. 3, a1·P1/2 to a4·P1/2 respectively. If, in this case, the ratios I1/PD1 to I4/PD4 to the reference values PD1 to PD4 are calculated by the processing unit 8b, as shown in B2 of FIG. 3, all ratios are a matching value of P1/P0. Therefore, in this case, the processing unit 8b determines that only an ASE light is being input (step A4 from a Yes route of step A3). The signal light monitoring unit 4d sends a message as a determination result to the control unit 4c that only an ASE light is being input. Accordingly, the control unit 4c can maintain a control state of excitation-off. In this case, the processing unit 8b continues to determine differences of ratio values of the current values I1 to I4 from the first to fourth photo-diodes 8a-1 to 8a-4 to the reference values (step A4 to step A1).

It is also assumed that the current values I1 to I4 from the first to fourth photo-diodes 8a-1 to 8a-4 are, as shown in C1 of FIG. 3, a1·P1/2 to a3·P1/2 and a4·P1 respectively. If, in this case, the ratios I1/PD1 to I4/PD4 to the reference values PD1 to PD4 are calculated by the processing unit 8b, as shown in C2 of FIG. 3, only the value of I4/PD4 becomes 2·P1/P0 and thus, not all values match. Therefore, in this case, the processing unit 8b determines that a signal light is being input (step A5 from a No route of step A3). The signal light monitoring unit 4d sends a message as a determination result to the control unit 4c that a signal light is being input. Accordingly, the control unit 4c can switch the control state from excitation-off to excitation-on (step A6).

FIG. 4 is, in contrast to FIG. 3, an operation explanatory diagram focusing on operations when excitation control for the optical amplifier 4b is switched from on to off after light being input into the optical amplification unit 4 undergoes a transition of state containing a signal light to that containing no signal light. That is, while the control unit 4c constituting the optical amplification unit 4 controls the optical amplifier 4b to turn on the excitation state for operational channels, when discontinuation (non-input) of signal light input is determined by the signal light monitoring unit 4d, the control unit 4c controls the optical amplifier 4b to turn off the excitation state.

At this time, like the case in FIG. 3, the signal light monitoring unit 4d has a portion of light input into the optical amplification unit 4 input through the optical coupler 4a. The input branched light is branched in four directions by the optical splitter 6 and four mutually different polarization components are extracted from four branched lights from the optical splitter 6 by the polarization component extraction unit 7. The first to fourth photo-diodes 8a-1 to 8a-4 detect power of the first to fourth polarization component extracted lights extracted by the polarization component extraction unit 7 respectively and output electric signals (here, the current signals I1 to I4) as detection results to the processing unit 8b (step E1).

Then, like the case in FIG. 3, the processing unit 8b calculates the ratios I1/PD1 to I4/PD4 of the input current values I1 to I4 to the reference values PD1 to PD4 preset for each to determine whether power of polarization component lights is equal by comparing the ratios calculated in this manner with each other (step E2).

If, for example, the current values I1 to I4 from the first to fourth photo-diodes 8a-1 to 8a-4 are, as shown in C1 of FIG. 4, a1·P1/2 to a3·P1/2 and a4·P1 respectively, as shown in FIG. C2, not all values calculated as described above match. Therefore, in this case, the processing unit 8b determines that a signal light is being input (step E4 from the No route of step E3). The signal light monitoring unit 4d sends a message as a determination result to the control unit 4c that a signal light is being input. Accordingly, the control unit 4c can maintain the control state of excitation-on. In this case, the processing unit 8b continues to determine differences of ratio values of the current values I1 to I4 from the first to fourth photo-diodes 8a-1 to 8a-4 to the reference values (step E4 to step E1).

If the current values I1 to I4 from the first to fourth photo-diodes 8a-1 to 8a-4 are, as shown in B1 of FIG. 4, a1·P1/2 to a4·P1/2 respectively, as shown in B2, all values of ratios calculated as described above match. Therefore, in this case, the processing unit 8b determines that only an ASE light is being input and no signal light is being input (step E5 from the Yes route of step E3). The signal light monitoring unit 4d sends a message as a determination result to the control unit 4c that only an ASE light is being input. Accordingly, the control unit 4c can switch the control state from excitation-on to excitation-off (steps E6 and E7).

According to the first embodiment, as described above, whether input contains signal light components or only an ASE light can be determined by a simple monitor configuration of optical power and therefore, appropriate control of the optical amplifier 4b can be performed using a determination result thereof so that an occurrence of light surges of light being input into the optical receiver 5 constructed by including a photo detector can be avoided by using a configuration realizable at relatively low costs. Also, according to the configuration in the first embodiment, the bit rates and formats of a light signal are not relied on and therefore, systems of different bit rates or formats can also be flexibly dealt with.

Figure 5:
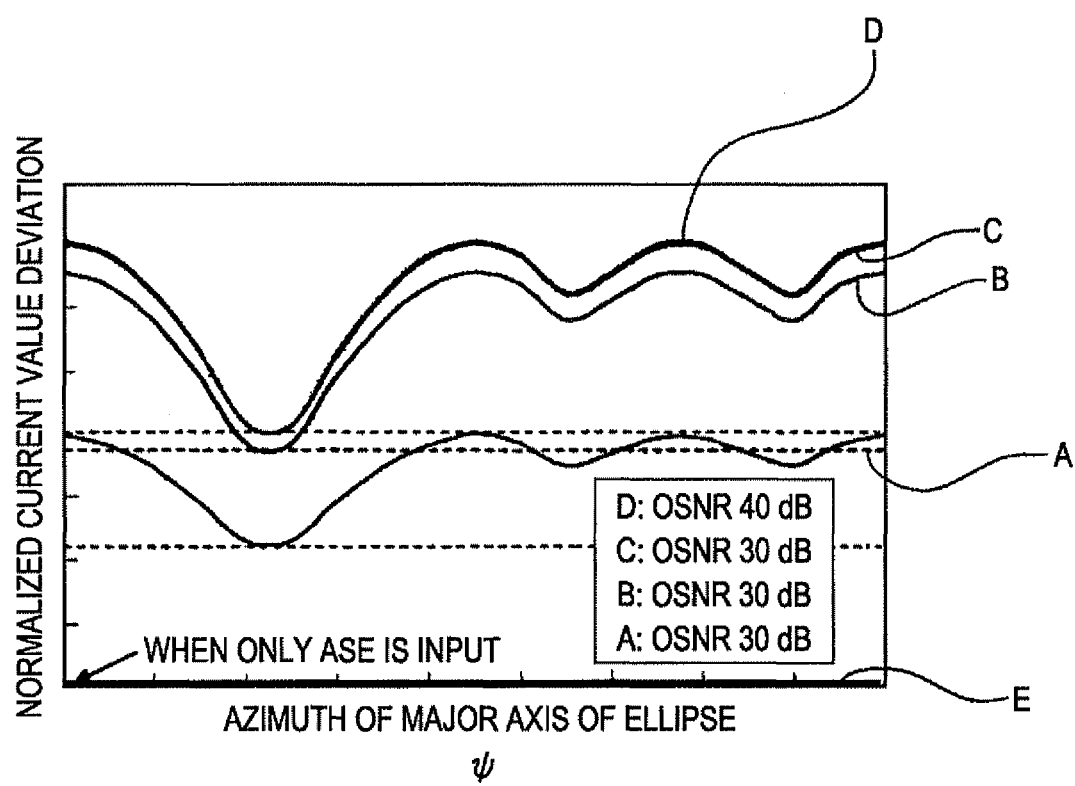
FIG. 5 is a diagram for illustrating that a normalized current value of a specific polarization component extracted light is different depending on an OSNR value.

Incidentally, the ratios to the reference values are introduced to determine whether power of polarization component lights is equal for the above processing unit 8b, but in addition to this, a range of values in which power of polarization component lights can be considered to be equal can be set. That is, if differences of power of four polarization components are within the preset range, all power of the four polarization components is deemed to be equal. If differences of magnitudes of the four polarization components are not within the above preset range, on the other hand, the magnitude of power of at least one polarization component of the four polarization components is determined to be different from magnitudes of other polarization components. Here, the above range of values in which identity of power can be determined is a range in which power can be deemed to be substantially identical and can be specified, for example, based on signal quality. As shown in FIG. 5, for example, the normalized current value of a specific polarization component extracted light changes depending on the OSNR value (10 dB, 20 dB, 30 dB, and 40 dB) indicating signal quality (See A to D in FIG. 5) and therefore, a deviation of the current value when an ASE light is input (See E in FIG. 5) also changes depending on the OSNR value. Thus, whether power values are equal or not can effectively be determined also by setting the range for determining optical power in accordance with signal quality.

[B] Description of the Second Embodiment

Figure 6:
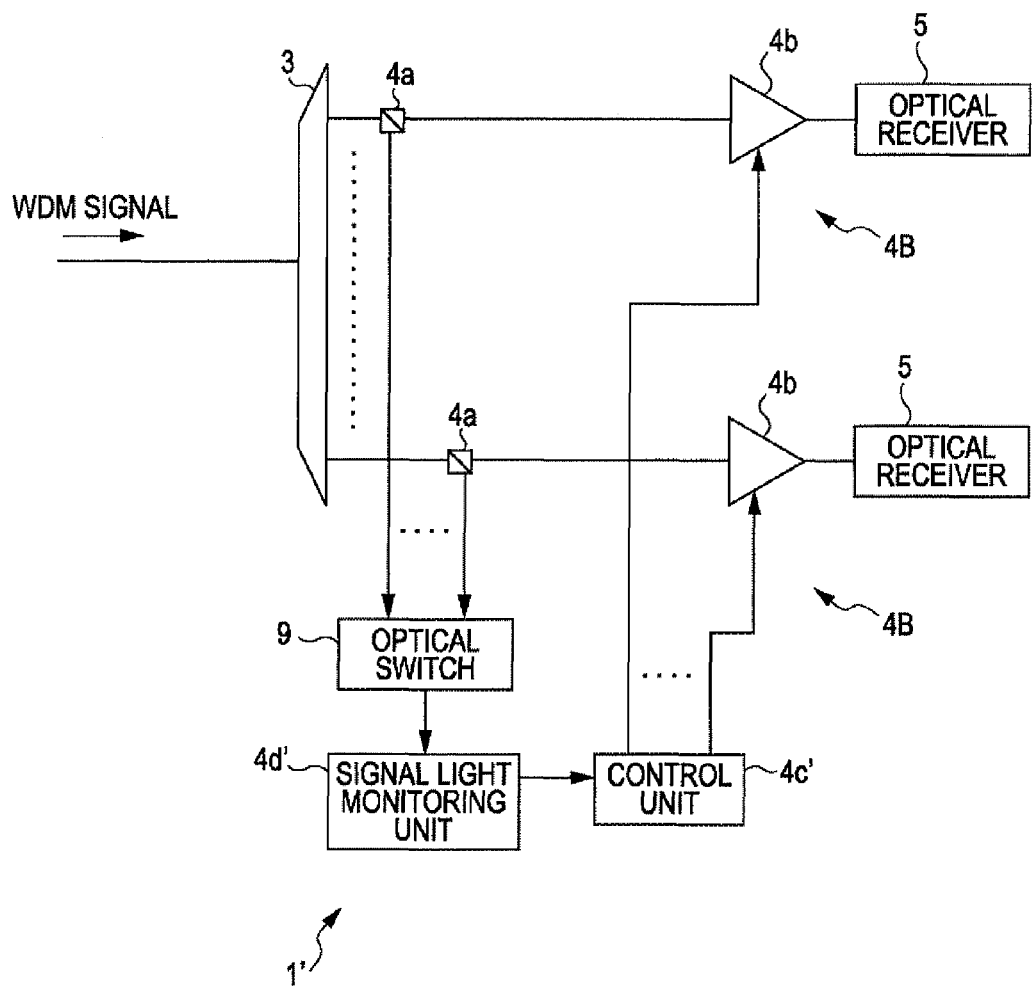
FIG. 6 is a diagram for illustrating an optical reception apparatus in a second embodiment.

FIG. 6 is a diagram for illustrating an optical reception apparatus 1' according to the second embodiment. The optical reception apparatus 1' shown in FIG. 6 is different in that the function as a signal light monitoring unit 4d' constituting each optical amplification unit 4B is configured for shared use by introducing an optical switch 9 and other components are basically the same. The same reference numerals in FIG. 6 as those in FIG. 1 denote approximately the same components.

The optical switch 9 captures a portion of light of each of the plurality of wavelength components output to the plurality of optical amplification units 4B after being demultiplexed by the optical demultiplexer 3 and selectively outputs one of the plurality of wavelength components. Then, the signal light monitoring unit 4d' is a signal light monitoring unit that monitors the input state for a signal light based on light from the optical switch 9 and configures the function of the signal light monitoring unit 4d constituting the plurality of optical amplification units 4 shown in FIG. 1 for shared use. The signal light monitoring unit 4d' also includes the optical splitter 6, the polarization component extraction unit 7, and the determination unit 8, which are basically the same as those shown in FIG. 1 (See reference numeral 4d).

A control unit 4c' can perform control to turn on feeding of excitation power to the optical amplifier 4b when a signal light of light of the wavelength selected by the optical switch 9 is being input based on a determination result from the determination unit 8, and to turn off feeding of excitation power to the optical amplifier 4b when no signal light is being input.

Advantages similar to those of the first embodiment can be gained from the optical reception apparatus 1' constructed as described above and the optical reception apparatus 1'can advantageously be constructed as a more contact apparatus as that in the first embodiment.

[C] Description of the Third Embodiment

FIG. 7 is a diagram for illustrating an optical reception apparatus 10 according to the third embodiment. The optical reception apparatus 10 shown in FIG. 7 is different from the optical reception apparatus in the first or second embodiment in the configuration as a signal light monitoring unit 4e constituting an optical amplification unit 4C and other components (reference numerals 2, 3, 4a to 4c, and 5) are basically the same.

A plurality of the optical amplification units 4C corresponding to the number of wavelengths demultiplxed by the optical demultiplexer 3 is provided to amplify lights demultiplxed by the optical demultiplexer 3 and each of the optical amplification units 4C includes the optical coupler 4a, the optical amplifier 4b, and the control unit 4c like those in the first or second embodiment and also the signal light monitoring unit 4e. Here, the signal light monitoring unit 4e monitors the input state for a signal light into the optical amplifier 4b amplifying light of each wavelength demultiplexed by the optical demultiplexer 3 and includes a polarization scrambler 11, a polarizer 12, a photo-diode 13 as a power detector, and a determination unit 14 corresponding to each wavelength demultiplxed by the optical demultiplexer 3.

The polarization scrambler 11 constituting each of the optical amplification units 4C is a polarization state variation provider that, after light demultiplexed by the optical demultiplexer 3 being input via the optical coupler 4a, causes the polarization state of the input light to cyclically vary by means of scrambling. The polarizer 12 extracts a linear polarization component in a specific direction from light whose polarization state is cyclically varied by the polarization scrambler 11 acting as a polarization state variation provider. The photo-diode 13 detects power of light extracted by the polarizer 12, which may have a relatively low response time. This is because being able to capture variations (of a relatively long cycle) of a polarization state as the polarization scrambler 11 is sufficient for the polarizer 12 as a monitor function of signal light input.

Further, the determination unit 14 determines that a signal light is being input when cyclic variations resulting from those of the polarization state caused by the polarization scrambler 11 is contained in power of light extracted by the polarizer 12 based on a detection result of optical power from the photo-diode 13, and that no signal light is being input when no cyclic variations are contained.

Figure 8A:
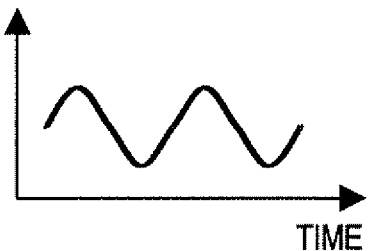
FIGS. 8A and 8B are both diagrams for illustrating power of light of a specific linear polarization component after being passed through a polarizer when the signal light is being input to be contrasted with that when the signal light is not being input.
Figure 8B:
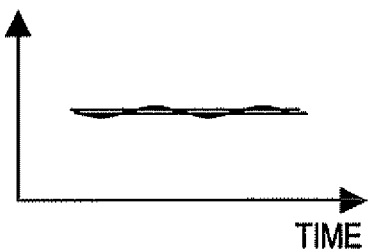
Figure 11:
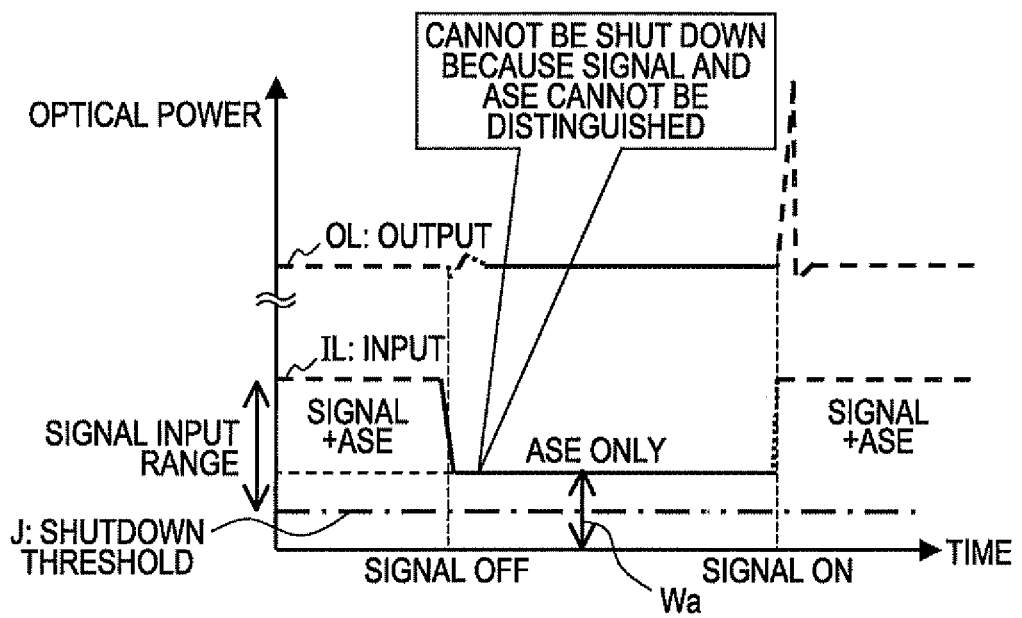
FIG. 11 is a diagram for illustrating the background technology of the present embodiment.

FIG. 8A and FIG. 8B are diagrams for comparison of power of light of a specific linear polarization component after passing through the polarizer 12 when a signal is being input (FIG. 8A) and no signal light is being input (FIG. 8B). When a linear polarization component after being passed through the polarizer 12 of a signal light polarization-scrambled by the polarization scrambler 11 is extracted, conversion of the linear polarization component light occurs, as shown in FIG. 8A, in which polarization variations are converted into cyclic optical power variations. If, on the other hand, no signal light is being input and only a non-polarized ASE light is being input, as shown in FIG. 8B, no power variation is detected.

If detected optical power cyclically varies based on a detection result from the photo-diode 13, the determination unit 14 determines that a signal light of the wavelength is being input and outputs a message to that effect to the control unit 4c. If detected optical power is substantially constant, on the other hand, the determination unit 14 determines that no signal light of the wavelength is being input and outputs a message to that effect to the control unit 4c. The determination unit 14 makes a determination in a cycle shorter than that of cyclic variations contained in power of light extracted by the polarizer 12. Accordingly, the determination unit 14 can reliably determine input/non-input of a signal light.

Then, the control unit 4c can perform control to turn on feeding of excitation power to the optical amplifier 4b when a signal light of light is being input based on a determination result from the determination unit 14, and to turn off feeding of excitation power to the optical amplifier 4b when no signal light is being input.

In the optical reception apparatus 10 shown in FIG. 7, the polarization scrambler 11 corresponding to the wavelengths demultiplexed by the optical demultiplexer 3 is provided to monitor input/non-input of signal light components contained in light of each wavelength demultiplexed by the optical demultiplexer 3, but a WDM light in a stage before being demultiplexed by the optical demultiplexer 3 may be scrambled. In this way, a polarization scrambler can be configured for shared use as a component in the signal light monitoring unit 4e corresponding to each wavelength (See reference numeral 11').

When compared with the configuration in which the polarization scrambler 11' is configured for shared use, the configuration including the polarization scrambler 11 corresponding to the wavelengths demultiplexed by the optical demultiplexer 3 allows monitoring of input/non-input of a signal light while avoiding signal quality of a signal light received by the optical receiver 5 being degraded by polarization variations.

Also in the optical reception apparatus 10 constructed as described above, by the polarization scrambler 11 of the signal light monitoring unit 4e, since input light demultiplexed by the optical demultiplexer 3 is polarization-scrambled, signal light input can be determined by monitoring power variations of the linear polarization component after being passed through the polarizer 12, enabling on/off control of excitation of the optical amplifier 4b in accordance with a determination result.

Also in the third embodiment, as described above, input/non-input of a signal light can be determined with a relatively simple configuration by means of the component in the signal light monitoring unit 4e, gaining advantages similar to those in the first and second embodiments.

After the model of the second embodiment, the component as the signal light monitoring unit 4e, which needs to be provided for each wavelength in the case shown in FIG. 7, can also be configured for shared use by introducing the optical switch 9. If, in a configuration in which the polarization scrambler 11' is provided in a stage prior to the optical demultiplexer 3, the optical switch 9 should be introduced, the polarizer 12, the photo-diode 13, and the determination unit 14 constituting each signal light monitoring unit can be configured for shared use.

The above optical reception apparatus 10 according to the third embodiment includes the polarization scrambler 11 (11') as a polarization state variation provider, but the present invention is not limited to this and, if the polarization state variation provider is configured, for example, by a polarization controller, cyclic variations of the polarization state can be provided so that at least signal light input can be detected.

[D] Others

Regardless of the above embodiments, the present invention can be carried out in various modifications without departing from the above scope.

For example, a function as a signal light monitoring unit is placed outside an optical amplifier in each of the above embodiments, but the function may also be placed inside the optical amplifier.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An apparatus comprising:
an optical amplifier for amplifying an input light by excitation power;

a control unit controlling feeding of the excitation power to the optical amplifier; and a signal light monitoring unit monitoring an input state of a signal light input into the optical amplifier, wherein the signal light monitoring unit comprises:

an optical branching unit branching a branched light of light input into the optical amplifier in four directions;

a polarization component extraction unit extracting four polarization components having mutually different polarization parameters from lights branched in four directions by the optical branching unit; and a determination unit determining input/non-input of the signal light based on the four polarization components extracted by the polarization component extraction unit before outputting a result of the determination to the control unit, wherein the control unit turns on feeding of the excitation power to the optical amplifier when the signal light is being input based on the result of the determination from the determination unit and turns off feeding of the excitation power to the optical amplifier when the signal light is not being input.

2. An apparatus, comprising:

an optical demultiplexer demultiplexing a light input from a wavelength division multiplexing transmission line into a plurality of wavelength components; and optical amplification units provided as many as a number of wavelengths demultiplexed by the optical demultiplexer to amplify lights demultiplexed by the optical demultiplexer, wherein each optical amplification unit comprising:

an optical amplifier for amplifying an input light by excitation power;

a control unit controlling feeding of the excitation power to the optical amplifier; and a signal light monitoring unit monitoring an input state of a signal light input into the optical amplifier, wherein the signal light monitoring unit comprising:

an optical branching unit branching a branched light of light input into the optical amplifier in four directions;

a polarization component extraction unit extracting four polarization components having mutually different polarization parameters from lights branched in four directions by the optical branching unit; and a determination unit determining input/non-input of the signal light based on the four polarization components extracted by the polarization component extraction unit before outputting a result of the determination to the control unit, wherein the control unit turns on feeding of the excitation power to the optical amplifier when the signal light is being input based on the result of the determination from the determination unit and turns off feeding of the excitation power to the optical amplifier when the signal light is not being input.

3. An apparatus, comprising:

an optical amplifier for amplifying an input light by excitation power;

a control unit controlling feeding of the excitation power to the optical amplifier; and a signal light monitoring unit monitoring an input state of a signal light input into the optical amplifier, wherein the signal light monitoring unit, comprising:

a polarization state variation provider causing a polarization state of light input into the optical amplifier to cyclically vary;

a polarizer extracting a linear polarization component in a specific direction from a branched light of light the polarization state of which is varied by the polarization state variation provider before being input into the optical amplifier;

a power detector detecting power of light extracted by the polarizer; and a determination unit determining that the signal light is being input when cyclic variations resulting from variations of the polarization state caused by the polarization state variation provider is contained in power of light extracted by the polarizer based on a detection result from the power detector, and that the signal light is not being input when the cyclic variations are not contained, wherein the control unit turns on feeding of the excitation power to the optical amplifier when the signal light is being input based on the result of the determination from the determination unit and turns off feeding of the excitation power to the optical amplifier when the signal light is not being input.

4. An apparatus, comprising:

an optical demultiplexer demultiplexing a light input from a wavelength division multiplexing transmission line into a plurality of wavelength components; and optical amplification units provided as many as a number of wavelengths demultiplexed by the optical demultiplexer to amplify lights demultiplexed by the optical demultiplexer, wherein each optical amplification unit, comprising:

an optical amplifier for amplifying an input light by excitation power;

a control unit controlling feeding of the excitation power to the optical amplifier; and a signal light monitoring unit monitoring an input state of a signal light input into the optical amplifier, wherein the signal light monitoring unit, comprising:

a polarization state variation provider causing a polarization state of light input into the optical amplifier to cyclically vary;

a polarizer extracting a linear polarization component in a specific direction from a branched light of light the polarization state of which is varied by the polarization state variation provider before being input into the optical amplifier;

a power detector detecting power of light extracted by the polarizer; and a determination unit determining that the signal light is being input when cyclic variations resulting from variations of the polarization state caused by the polarization state variation provider is contained in power of light extracted by the polarizer based on a detection result from the power detector, and that the signal light is not being input when the cyclic variations are not contained, wherein the control unit turns on feeding of the excitation power to the optical amplifier when the signal light is being input based on the result of the determination from the determination unit and turns off feeding of the excitation power to the optical amplifier when the signal light is not being input.

5. The apparatus according to claim 2, further comprising:

an optical switch that captures a portion of light of each of the plurality of wavelength components output to the plurality of optical amplification units after being demultiplexed by the optical demultiplexer and selectively outputs one of the plurality of wavelength components, wherein the signal light monitoring unit is configured to monitor the input state of the signal light based on light from the optical switch, and the control unit is configured to turn on feeding of the excitation power to the optical amplifier for amplifying a light of the wavelength selected by the optical switch when the signal light is being input based on the result of the determination from the determination unit and to turn off feeding of the excitation power to the optical amplifier when the signal light is not being input.

6. The apparatus according to claim 4, wherein the polarization state variation provider constituting the plurality of optical amplification units is configured for shared use by the plurality of optical amplification units by varying the polarization state of light in a stage before being demultiplexed by the optical demultiplexer.

7. The apparatus according to claim 4, wherein the polarization state variation provider is configured by a polarization controller or a polarization scrambler.

8. The apparatus according to claim 4, wherein the determination unit is configured so that the determination unit makes the determination in a cycle shorter than that of the cyclic variations contained in power of light extracted by the polarizer.

9. A method comprising:

extracting a plurality of polarization components having mutually different polarization parameters from a light;

after extracting the plurality of polarization components, providing the light to an erbium doped fiber so that the provided light is amplified as the provided light travels through the erbium doped fiber;

determining whether signal light is included in the provided light based on the extracted polarization components, to thereby provide a determination result; and controlling whether excitation light is fed to the erbium doped fiber to amplify the provided light as the provided light travels through the erbium doped fiber, in accordance with the determination result.

10. A method as in claim 9, wherein said controlling comprises:

when the determination result indicates that signal light is included in the received light, feeding excitation light to the erbium doped fiber so that the provided light is amplified as the provided light travels through the erbium doped fiber; and when the determination result indicates that signal light is not included in the received light, not allowing the excitation light to be fed to the erbium doped fiber.

11. A method as in claim 9, wherein the plurality of polarization components includes four polarization components.

12. A method as in claim 10, wherein the plurality of polarization components includes four polarization components.

13. An apparatus comprising:

means for extracting a plurality of polarization components having mutually different polarization parameters from a light;

means, after extracting the plurality of polarization components, for providing the light to an erbium doped fiber so that the provided light is amplified as the provided light travels through the erbium doped fiber;

means for determining whether signal light is included in the provided light based on the extracted polarization components, to thereby provide a determination result; and means for controlling whether excitation light is fed to the erbium doped fiber to amplify the provided light as the provided light travels through the erbium doped fiber, in accordance with the determination result.

14. A method comprising:

controlling feeding of excitation light an erbium doped fiber to thereby control amplification of input light traveling through the erbium doped fiber, in accordance with a determination of whether signal light is present in the input light based on polarization components having mutually different polarization parameters extracted from the input light.

* * * * *

UNITED STATES PATENT AND TRADEMARK OFFICE
CERTIFICATE OF CORRECTION

| | | |
|---|---|---|
| PATENT NO. | : 8,705,168 B2 | Page 1 of 1 |
| APPLICATION NO. | : 13/476351 | |
| DATED | : April 22, 2014 | |
| INVENTOR(S) | : Yuki et al. | |

It is certified that error appears in the above-identified patent and that said Letters Patent is hereby corrected as shown below:

On the Title Page Item [56] (OTHER PUBLICATIONS), Line 1, delete "Notificaiton" and insert -- Notification --, therefor.
On the Title Page Item [56] (OTHER PUBLICATIONS), Line 4, delete "Stufy" and insert -- Study --, therefor.

Signed and Sealed this
Twenty-second Day of July, 2014

Michelle K. Lee
*Deputy Director of the United States Patent and Trademark Office*